Patented May 9, 1939

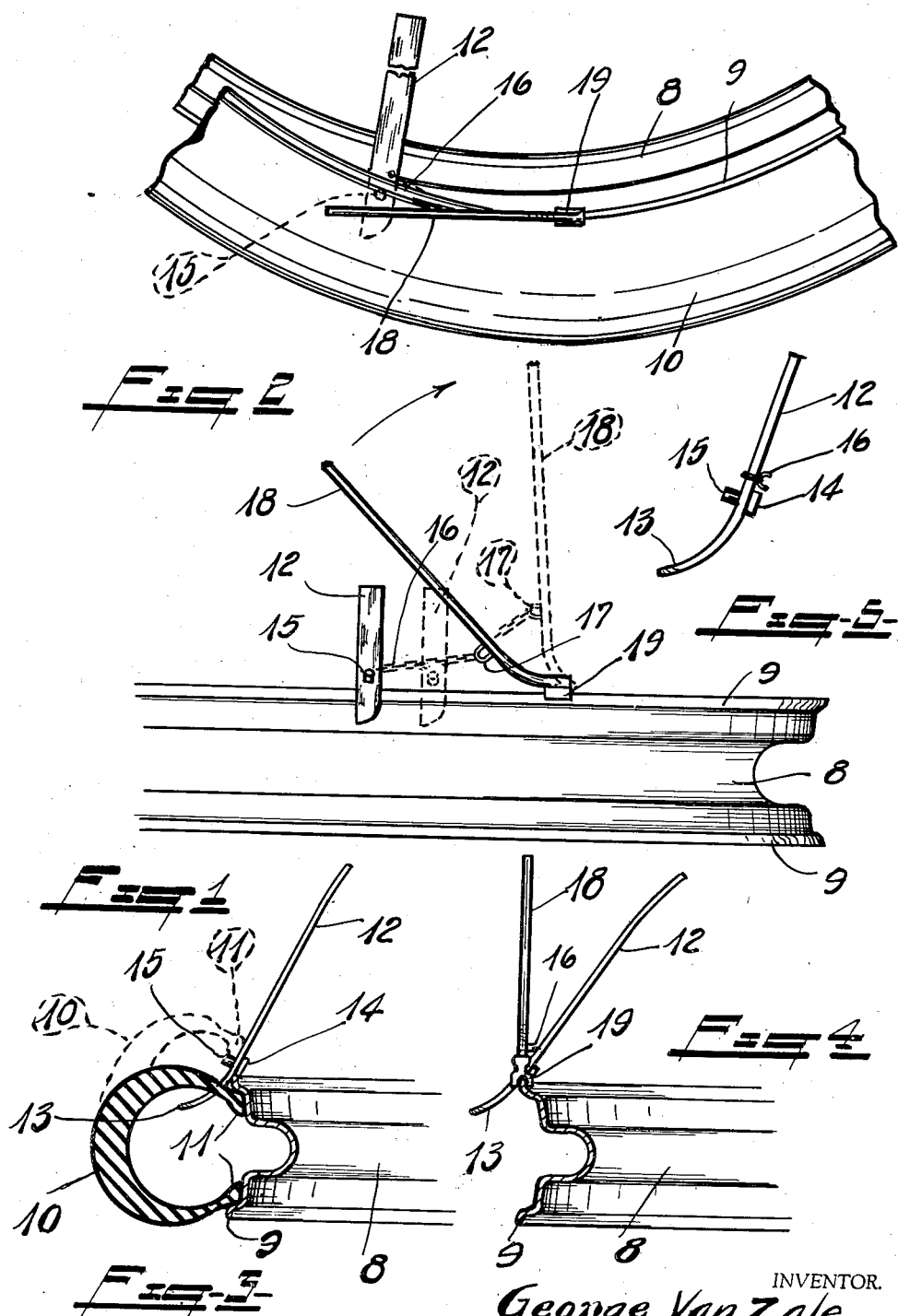

2,157,443

UNITED STATES PATENT OFFICE 2,157,443

TIRE REMOVING TOOL

George Van Zale, Bay City, Mich.

Application March 26, 1937, Serial No. 133,159

5 Claims. (Cl. 157—6)

This invention relates to tire removing tools and more particularly to a tool for removing tires from drop center rims.

A great deal of difficulty is experienced by garage and tire repair men in removing tires from drop center rims, as is necessary when changing tires, repairing punctures or blowouts, the tire must of necessity be a tight fit when in position on the rim, and must be sprung over the edge of the rim when the tire is being removed. Due to the fact that the rim is continuous, the tire must be sprung over the rim at one point and then held to prevent its slipping back in position on the rim, after which additional tools must be inserted at spaced apart points to pry the one edge of the tire free from the rim. The operator usually stands on the rim or wheel to hold it against movement, and this together with the necessary tools mars the rim, gouges the tire and makes a very unsatisfactory job.

One of the prime objects of the invention, therefore, is to provide a very simple tool engageable with the tire and rim, so that the tire can be easily and quickly removed without marring the rim, damaging the tire and/or inner casing, and with a minimum of labor and effort.

Another object of the invention is to design a tool for the removal of tires which will not wedge or pinch the inner tube or casing, which is very economical to manufacture, and which has rolling contact with the bead of the tire, so that the removal will be smooth and easy.

A further object is to provide a tire tool of practical design, and which removes the tire by prying the bead of the tire from the rim, and then rolling the beaded edge on the tool, which the workman operates in a step by step movement around the circumference of said rim.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing:

Fig. 1 is an edge elevational view showing a vehicle rim with my tire removing tool associated therewith, the broken lines illustrating the step by step movement of the tool, and Fig. 2 is a top plan view.

Fig. 3 is an enlarged fragmentary sectional view of the vehicle rim and tire showing the mounting of the wedge bar, the pulling lever being omitted.

Fig. 4 is a view similar to Fig. 3 showing the wedge bar and pulling lever associated with the rim.

Fig. 5 is an enlarged detail of the wedge bar.

Referring now more particularly to the drawing in which I have shown the preferred embodiment of my invention, the numeral 8 indicates a drop center rim of conventional design which is formed with beaded edges 9 as usual, these rims being adapted to receive pneumatic tires 10 in the usual manner.

Drop center rims are formed in one continuous piece, and the pneumatic tires 10 are formed with heavy beaded edges 11 which closely fit said rim, so that when a tire is punctured, the removal of the tire is difficult even with the tools at present available on the market, as this heavy beaded edge must be forced upwardly and over the beaded edge of the rim in this removal process.

Furthermore, if it is forced over at the one point, it must be held in such position until almost one half the circumference of one beaded edge is free; otherwise it slips back on the rim. I, therefore, provide a flat wedge bar 12, the lower end of which is curved as shown at 13 to facilitate its insertion when the removal operation is begun. A small block 14 is welded or otherwise secured to the bottom face of this bar, and an anti-friction roller 15 is mounted on the upper face as shown, said roller being freely revoluble and engaging the beaded edge 11 of the pneumatic tire.

A flexible chain or cable 16 is anchored to the wedge bar 12 at a point directly adjacent the roller 15, the opposite end of said chain being connected to an eye 17 provided on a pulling lever 18, the lower end of said lever being curved as shown and terminating in a channel shaped shoe 19, the inner surface of which is lined with lead or other similar material so that it does not mar the beaded edge of the rim when the tool is operated and when the shoe is placed on the edge of the rim and the free end of the lever swung forwardly over the shoe, the chain connection will pull the wedge bar around on the rim accordingly.

In practice the rim with the tire in position is placed flat on the floor or other support, the curved end of the wedge bar is then inserted between the rim and the tire, and the beaded edge to the tire placed over and in position to engage the roller as clearly shown in broken lines in Fig. 3 of the drawing, the stop block 14 contacting and sliding on the outer edge of the rim. The operator then places the pull lever in position as indicated in solid lines in Fig. 1 with the channel shoe on the edge of the rim, then by swinging the free end of the pull lever forwardly over the shoe to the position shown in broken lines the wedge bar will be drawn around on the rim to the position shown in broken lines in the same figure, the beaded edge 11 of the tire being forced out of the rim, riding on the roller 15 and minimizing friction, the stop 14 limiting the inward travel of the wedge bar, then by again swinging the free end of the lever bar down, and then by successively advancing the channel shaped shoe on the rim and repeating the operation, the entire beaded edge of the tire can be quickly and efficiently removed without injury to the tire and/or inner casing or marring of the rim and/or wheel.

From the foregoing description, it will be obvious that I have perfected a very simple, practical, and economical tire tool which is efficient in operation, which can be operated by unskilled labor, and which can be readily manufactured and assembled.

What I claim is:

1. A tire tool of the character described comprising a wedge bar adapted to be inserted between the bead of the tire and the edge of a drop center rim, an anti-friction means mounted on said bar and spaced from one end thereof and engaging the bead of the tire, a pull lever, the lower end of the pull lever being curved and terminating in a rim engaging shoe, and flexible means connecting said wedge bar and pull lever.

2. A tire tool of the character described and comprising a flat wedge bar, an anti-friction roller mounted thereon at a point spaced from the lower end thereof, a stop on the lower face of the bar, a pull lever, the lower end being curved and terminating in a channel shaped shoe, and a flexible means of predetermined length for connecting said bar and lever.

3. A tire tool of the character described comprising a flat wedge bar having a slightly curved end section adapted to be inserted between the vehicle rim and one beaded edge of a tire, an anti-friction roller mounted on one face of said bar at a point spaced from the curved end thereof, and over which the beaded edge of the tire is placed, a stop on the opposite face and forming a gauge for limiting the bar extension over the rim, a pull lever having a curved lower end, a shoe on the curved end, and flexible means anchored to and connecting said bar and lever at points spaced from the curved ends thereof.

4. A tire tool of the character described and comprising a flat wedge bar formed with a curved end section adapted to be inserted between a vehicle wheel rim and the tire, an anti-friction roller mounted on said bar, and at a point spaced from the curved end thereof, a rim engaging gauge on said bar to limit the bar extension over the rim, and means flexibly connected to said bar for pulling the bar in a step by step movement around the circumference of the rim without removing said bar from its position between the tire and rim.

5. A tire removing tool of the class described and comprising a flat wedge bar having a curved end section adapted to be interposed between a wheel rim and the bead of a tire, a roller mounted on the bar at a point spaced from the curved end of said bar, a rim engaging stop on one face of the bar, and a rim engaging member flexibly connected to said bar, and adapted to be actuated in a series of step by step movements to pull said bar around the circumference of the rim.

GEORGE VAN ZALE.